US012641179B1

(12) United States Patent
Hansen et al.

(10) Patent No.:   US 12,641,179 B1
(45) Date of Patent:         May 26, 2026

(54) ON-HOLD EXPERIENCE

(71) Applicant: United Services Automobile Association, San Antonio, TX (US)

(72) Inventors: Gregory David Hansen, San Antonio, TX (US); Megan Sarah Jennings, San Antonio, TX (US); Emily Margaret Gray, San Antonio, TX (US); Gregory B Yarbrough, San Antonio, TX (US); Madhusudhana Rao Abburi, San Antonio, TX (US); Charles Balasingh, San Antonio, TX (US); Janelle Denice Dziuk, Falls City, TX (US); Samip Dilip Mehra, Peoria, AZ (US); David Patrick Dixon, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 73 days.

(21) Appl. No.: 18/662,673

(22) Filed: May 13, 2024

Related U.S. Application Data

(63) Continuation of application No. 18/061,077, filed on Dec. 2, 2022, now Pat. No. 12,015,735, which is a continuation of application No. 17/214,398, filed on Mar. 26, 2021, now Pat. No. 11,533,397.

(60) Provisional application No. 63/001,101, filed on Mar. 27, 2020.

(51) Int. Cl.
H04M 3/428        (2006.01)
H04L 51/046       (2022.01)

H04L 67/55        (2022.01)
H04M 3/38         (2006.01)
H04M 3/51         (2006.01)

(52) U.S. Cl.
CPC .......... H04M 3/428 (2013.01); H04L 51/046 (2013.01); H04L 67/55 (2022.05); H04M 3/382 (2013.01); H04M 3/5183 (2013.01)

(58) Field of Classification Search
None
See application file for complete search history.

(56) References Cited

U.S. PATENT DOCUMENTS

| | | | |
|---|---|---|---|
| 11,533,397 | B1 | 12/2022 | Hansen et al. |
| 12,015,735 | B2 * | 6/2024 | Hansen ................. H04L 51/046 |
| 2003/0103618 | A1 * | 6/2003 | Brown .................. H04M 3/523 |
| | | | 379/265.09 |
| 2012/0164991 | A1 | 6/2012 | Zhu et al. |
| 2015/0227726 | A1 | 8/2015 | Grigg et al. |
| 2018/0278746 | A1 | 9/2018 | Yacov et al. |
| 2019/0045053 | A1 | 2/2019 | Desai et al. |

* cited by examiner

*Primary Examiner* — Hemant S Patel
(74) *Attorney, Agent, or Firm* — Potomac Law Group, PLLC; Dannon G. Allbee

(57) ABSTRACT

Technology for placing a user on-hold can include sending a push notification to a user device after the call has been placed on-hold. A link in the push notification can request authentication credentials from the user. When the authentication credentials have been received and verified, a chat window can be launched via an application on the user device. The intent of the call can be determined based at least in part by information received via the chat window. The authentication information and the intent of the call can be transferred to a representative answering the call.

17 Claims, 4 Drawing Sheets

ON-HOLD EXPERIENCE

CROSS-REFERENCE TO RELATED APPLICATION(S)

This application is a continuation application of U.S. application Ser. No. 18/061,077, filed on Dec. 2, 2022, entitled "On-Hold Experience," currently pending, which is a continuation application of U.S. application Ser. No. 17/214,398, filed on Mar. 26, 2021, entitled "On-Hold Experience," now U.S. Pat. No. 11,533,397, issued on Dec. 20, 2022, which claims priority to U.S. Provisional Application No. 63/001,101, filed on Mar. 27, 2020, entitled "On-Hold Experience," all of which are hereby incorporated by reference in their entirety for all purposes.

TECHNICAL FIELD

This disclosure is directed generally to systems, methods, and apparatus for improving a caller's on-hold experience with a call center.

BACKGROUND

When a person calls an organization's customer service phone number, he or she is often placed into a call hold queue. Depending upon factors such as time of day, weather, day of the week, and number of customer service representatives available to take calls, a caller may wait a long time to talk to a customer service representative. Long wait times can result in frustrated callers and potentially unhappy customers. Accordingly, it is desirable to improve the caller's on-hold experience.

Figure 1:
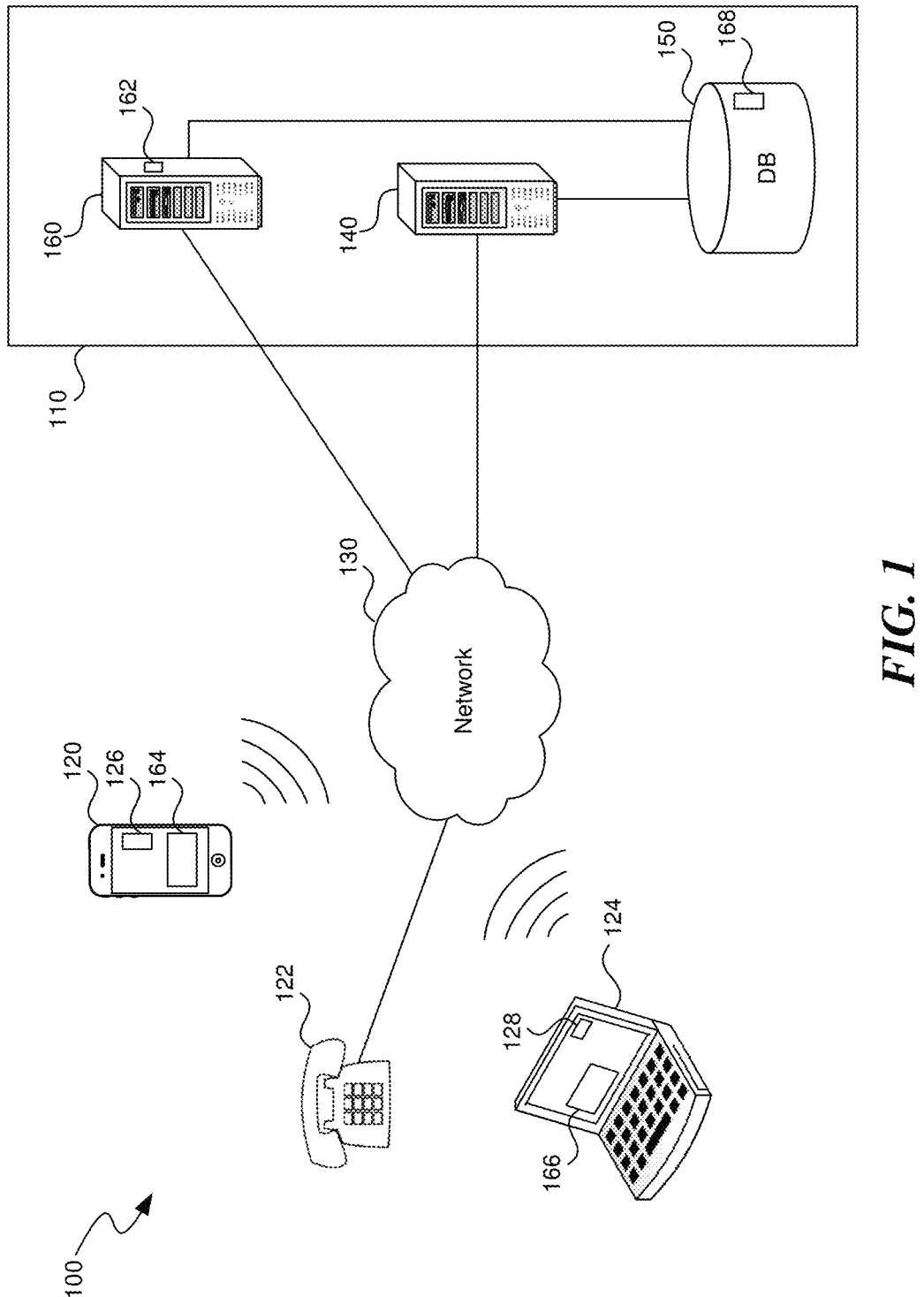
FIG. 1 shows an example of a call center system that can personalize and/or improve a user's on-hold experience in accordance with embodiments of the present technology.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

A call center system can accept a call and place a caller or user into an on-hold queue. As used herein, a person calling into the call center system is generally referred to as a "user". In some cases, the calls may be answered in the order in which they are received. During the wait time, users may be provided with music, information, general advertisements and offers from a business that can serve to provide content as well as auditory confirmation to the user that the call is still connected. Not all of the content may be helpful or interesting to the user. In some cases, the music and/or content may contribute to a user having a negative experience while they are on-hold. In other cases, a user may be waiting on-hold unnecessarily. That is, the user may not require assistance from a customer representative to address the issue, but instead can resolve their issue electronically if the user is able to locate the appropriate digital information.

To overcome at least some of the issues described above for an on-hold system, this patent document describes systems, apparatus, and methods for improving a user's on-hold experience. Embodiments of the present disclosure use multiple channels including both digital and voice to improve call routing. Various embodiments include initiating a chat session with a user while the user is on-hold, requesting information from the user such as authentication information and a context of the call. The system can digitally determine an intent of the call and authenticate the user while the call is on-hold. Such information can be used to route the call. Thus, call routing technology can be improved by reducing the number of transfers for the call as well as the overall call length. Additionally, such techniques can improve a user's satisfaction with the associated business. The example headings for the various sections below are used to facilitate the understanding of the disclosed subject matter and do not limit the scope of the claimed subject matter in any way. Accordingly, one or more features of one section can be combined with one or more features of another section.

Authenticate Credentials of User and Determine Call Reason

FIG. 1 shows an example of a call center system 100 that can personalize and/or improve a user's on-hold experience in accordance with embodiments of the present technology. A user of a user device 120, 122, 124 can call a number to talk to customer service representatives at an enterprise 110, which in some embodiments may be a customer call center of a business. The call from the user device 120, 122, 124 can be sent to or can be managed by a call routing server 140. In some embodiments, the user device 120 may be a mobile device such as a wearable, cellular or smart phone, the user device 122 may be a landline, and the user device 124 may be a computer or tablet. The user devices 120, 124 may include an application 126, 128 loaded thereon that is associated with the enterprise 110.

A call initiated by the user device 120, 122, 124 can be sent to the call routing server 140 via a communication network 130. The communication network 130 may include the Internet, a cellular network, a public switched telephone network (PSTN), a voice over Internet Protocol (VOIP) network, or any combination thereof. The call routing server 140, the database 150, and the on-hold server 160 may be configured to communicate with each other over the communication network 130 wirelessly or can be hard-wired or integrated with each other. The components within the enterprise 110 may be co-located at the same location or may be geographically distributed.

The call routing server 140 can transfer a call to an on-hold server 160, and the call can be placed in an on-hold queue 162. The on-hold queue 162 can include one list of users where the user who has been waiting the longest is the next served. Alternatively, multiple lists of users can be maintained within the on-hold queue 162, where users who have a priority status may be on one list, and separate lists may be defined for customer service representatives who address particular types of questions or concerns. The call routing server 140 and/or the on-hold server 160 can include or can be connected to at least one database 150 that can store customer information, such as authentication information and on-hold user preferences profiles 168, for users calling the customer call center. In some embodiments, a single server or more than one server may accomplish the various operations described herein of the call routing server 140 and the on-hold server 160.

While the call is in the on-hold queue 162, a chat window 164, 166 may be opened on the corresponding user device 120, 124 to allow the user to communicate electronically with the enterprise 110 as discussed further below. The chat window 164, 166 can be any type of electronic window displayed on the screen of the user device 120, 124, and may accept input via any allowable input of the user device 120, 124 (e.g., keyboard, mouse, microphone, and/or touch-screen).

Figure 2:
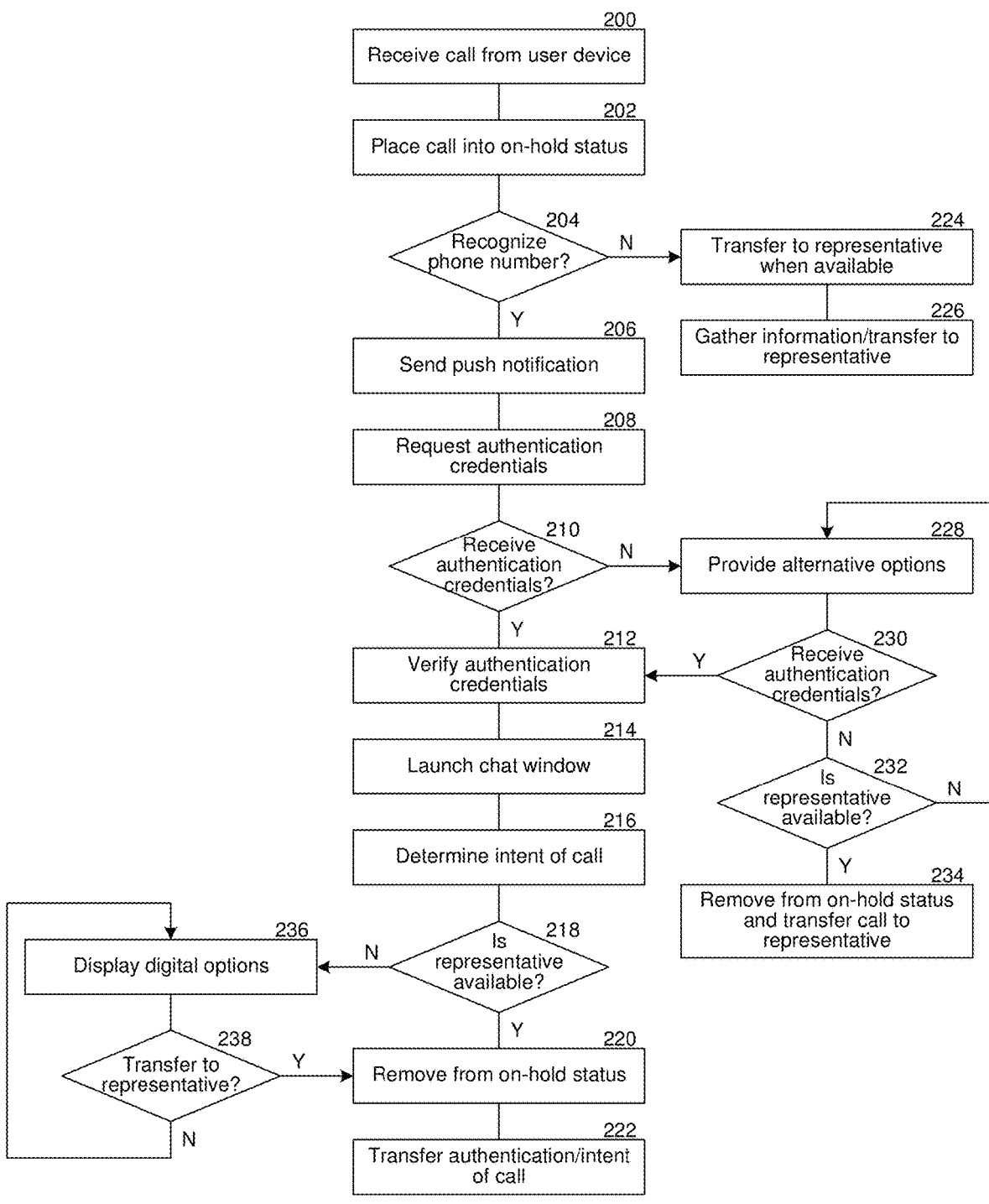
FIG. 2 shows an example process of authenticating a user and determining the intent of the user's call in accordance with embodiments of the present technology.

FIG. 2 shows an example process of authenticating a user and determining the intent of the user's call in accordance with embodiments of the present technology and will be discussed together with some of the elements of FIG. 1. At operation 200, the enterprise 110 receives a call from one of the user devices 120, 122, 124. At operation 202 the call routing server 140 places the call into an on-hold status, such as by placing the call into the on-hold queue 162 of the on-hold server 160.

At operation 204 the on-hold server 160 determines whether the call is associated with a customer profile such as by comparing the phone number to known numbers stored in the database 150. If the phone number is known or the device is otherwise identified (e.g., location of device), at operation 206 the on-hold server 160 sends a push notification to the user device 120, 124. The on-hold server 160 may not send the push notification to the user device 122 associated with a phone number, such as a landline, that is not capable of receiving the push notification, or may be configured to send the push notification in response to all verified phone numbers. In some examples, the user device 120, 124 can be the mobile phone, computer and/or tablet that has access to the internet and is configured to receive text messages, short message service (SMS) messages, instant messages, emails, and/or any other electronic communication in which a push notification may be sent. The push notification can be a link that, when activated by the user, will launch the application 126, 128 or launch a web browser to connect to a website associated with the enterprise 110. In some embodiments, the on-hold server 160 can send a push notification to the phone number associated with the call without determining that the phone number is associated with a customer profile.

At operation 208 the application 126, 128 or the website requests that the user enter or input authentication credentials. Authentication credentials can be a passcode and/or account number, an answer to one or more security questions, a match with a biometric profile such as facial recognition, voice recognition, fingerprint recognition, and the like. One or more authentication credentials may be requested.

At operation 210 the on-hold server 160 receives the authentication credentials from the user. The on-hold server 160 can have a time period during which it waits for the authentication credentials.

At operation 212 the on-hold server 160 verifies the authentication credentials. In some embodiments the on-hold server 160 may compare the authentication credentials input by the user to corresponding authentication credentials that can be stored in the database 150. In other embodiments the authentication credentials may be verified by the application 126, 128 on the associated user device 120, 124 or the webpage, and an associated message may be sent to the on-hold server 160 indicating whether the credentials are authenticated.

If the authentication credentials are verified, this can provide improved service to the user, such as shorter call times, more personalized service, and the ability to electronically resolve problems and/or questions without waiting for a customer service representative. At operation 214 the application 126, 128 or website can be directed, such as by the on-hold server 160, to open the chat window 164, 166 on the user device 120, 124. Chat from the chat window 164, 166 can be initiated by a chatbot. In some embodiments, the chat window 164, 166 can request authentication credentials from the user. In some embodiments, the user may sign into an account for the enterprise 110, such as on user device 124, then call the enterprise 110 using a different user device 120, 122. In this example, if the on-hold server 160 identifies that the user is logged into a device other than the calling device, the push notification may be sent to the user device 124 they are logged into to launch the chat window 166. With the chat window 164, 166 open, the user may simultaneously have a voice call and a digital interaction with the enterprise 110.

At operation 216, the on-hold server 160 determines the intent of the call at least in part by information received via the chat window 164, 166. For example, the chat window 164, 166 can display a list of options for the user to select from (e.g., open an account, request information regarding a certain account or service, credit card, insurance, loans, and/or update/verify a beneficiary). The list of options can be determined for the particular user based on products provided to the user, recent on-line activity or calls, time of year (e.g., tax time), or events in the user's life (e.g., birth of child, marriage) indicative of a need for additional or different products or an update in the user's profile. Depending upon the selection, the chat window 164, 166 can display additional options and/or questions to the user. Some or all of these options may function as an active link to provide additional options and/or information to the user.

In some embodiments, the system determines the reason for (e.g., intent of) the call prior to requesting authentication. Determining the reason for the call can, in some cases, help determine an authentication level required for completion of the activity or reason for the call. For example, some high-risk activities require a higher level of authentication (e.g., wire transfer of funds can require voice authentication) whereas others require a much lower level of authentication (e.g., check credit card balance requires a passcode). Thus, once the reason for the call is determined, the user can be asked for the appropriate level of credentials (e.g., user name/password, biometrics such as fingerprint, pulse received from wearable).

At operation 218, if the on-hold server 160 determines that a customer service representative is available, the on-hold server 160 removes the user from the on-hold status at operation 220. At operation 222, the on-hold server 160 transfers information indicating that the user's authentication credentials have been verified, information associated with the authentication credentials (e.g., name, account number) and the intent of the call (if known) to the customer service representative. This can provide efficient routing as well as information to the customer service representative that will enable them to provide faster and more specific information to the user, and can result in shorter call durations and a higher level of satisfaction for the user. In some embodiments, the activities the user selected during their on-hold time can be communicated to the customer service representative, such as information on products and services the enterprise 110 may offer. The customer service representative then has an opportunity to follow-up on the digital information that has been offered, improving customer service and potentially selling additional products to the user.

In some embodiments, if the intent of the call is determined at operation 216, the on-hold server 160 can identify one or more optimal customer service representatives to provide the desired assistance. If a specific customer service representative or group of customer service representatives is identified, the user may be placed within the appropriate group or sub-group within the on-hold queue 162. For example, one customer service representative may have training in account security while another customer service representative may have expertise in the suggestion of and allocation of investments within an investment account. This can improve the experience of the user by pairing the user with a customer service representative who has the best ability to help them.

Returning to operation 204, if the call routing server 140 cannot determine the phone number associated with the call, the phone number is not associated with a customer profile or the device cannot otherwise be identified and matched with a customer profile, such as may be stored in the database 150, the method passes to operation 224. At operation 224, the on-hold server 160 may transfer the user to a customer service representative as soon as a customer service representative is available.

If a customer service representative is not immediately available, at operation 226 the on-hold server 160 may use an Interactive Voice Response system (IVR) or touch-tone technology to attempt to gather information to identify the user. Examples of such identification can include a member number, login information, or personal information (e.g., social security number, phone number associated with an account) of the person. The on-hold server 160 may also try to determine the reason for their call. In an example banking use case, a user may be interested in discussing (1) credit card, (2) insurance, (3) loans, (4) account status, etc. Once a customer service representative is available, the on-hold server 160 transfers the call to the representative. In some embodiments, if the on-hold server 160 can identify the account, the method may return to operation 206 to send the push notification.

Returning to operation 210, if authentication credentials are not received, at operation 228 the on-hold server 160 provides the same functions as discussed in operation 226, namely, attempt to identify the user and determine the reason for their call. The on-hold server 160 can continue to monitor for the authentication credentials at operation 230. If authentication credentials are received, the method may return to operation 212. For example, a user may initiate a call when driving or may otherwise be unable to respond to the push notification. The on-hold server 160 continues to monitor the position of the user within the on-hold queue 162. When a customer service representative is available (operation 232), at operation 234 the on-hold server 160 removes the call from the on-hold status and transfers the user to the customer service representative.

Returning to operation 218, if no customer service representative is available, while the user remains in the on-hold status, at operation 236 the on-hold server 160 offers one or more digital options through the chat window 164, 166. In some embodiments the options can be tailored based on the intent of the call. This can resolve some issues electronically without involving a customer service representative. Some example solutions can be provided in the chat window 164, 166, such as a link, a list of instructions and/or steps that the user can take to resolve the problem (some of the instructions may also be links), a video, a series of options and/or screens to walk the user through the solution, or any other digital interaction. The chat window 164, 166 can be configured to accept input from any input device such as a finger, mouse, pointer, and voice commands.

The on-hold server 160 continues to monitor the position of the user in the on-hold queue 162. At operation 238, if a customer service representative is available, the on-hold server 160 can ask the user through the chat window 164, 166 if they would like to be transferred to the customer service representative. If the user responds through the chat window 164, 166 that they would like to be transferred, the method passes to operation 220. In some embodiments, the on-hold server 160 may additionally transfer information in a complete or summarized format regarding the digital exchange the user engaged in with the enterprise 110 in the chat window 164, 166. This information may facilitate better customer service and lead to a shorter call duration and greater user satisfaction. If at operation 238 the user indicates within the chat window 164, 166 that they do not wish to be transferred to a customer service representative, the chat window 164, 166 may display a selection button and/or link that the user can activate later to be transferred to a customer service representative. Alternatively, if the user does not respond to the option of being transferred to the customer service representative, the method may automatically pass to operation 220.

In some embodiments where a user is unable to be authenticated, it may be desirable to transfer a user to a customer service representative who is a security specialist or to a security department. This may be presented as an option to the user or implemented automatically. If a security specialist is not available during the time window in which the user is calling, the user may be given this information as well as one or more phone numbers and/or other information that may be helpful.

II. Personalize On-Hold Experience

As discussed above in FIG. 2, once the user is placed in the on-hold queue 162, the on-hold server 160 can offer a plurality of options to improve the user's on-hold experience and/or answer their questions without being transferred to a customer service representative. In some embodiments, the on-hold server 160 can be configured to provide a variety of options to the user even when there is no wait time to connect the user to a customer service representative.

Figure 3:
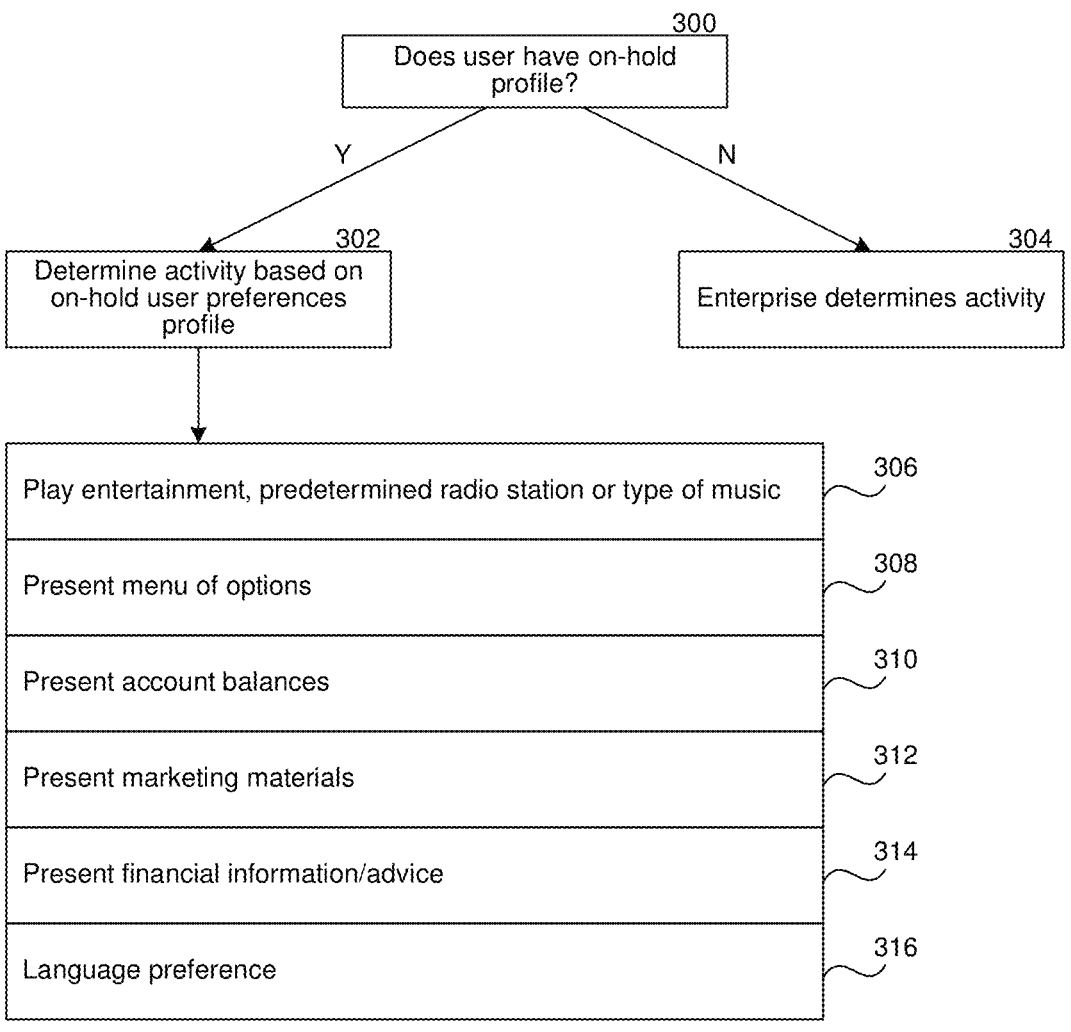
FIG. 3 shows an example flow diagram and table of options that may be used to personalize and/or optimize the user's on-hold experience after the user has been authenticated in accordance with embodiments of the present technology.

FIG. 3 shows an example flow diagram and table of options that may be used to personalize and/or optimize the user's on-hold experience after the user has been authenticated in accordance with embodiments of the present technology. At operation 300, the on-hold server 160 determines, such as through the database 150, whether the user has established the on-hold user preferences profile 168 (FIG. 1). For example, the user may have previously entered a list of preferences to customize their on-hold experience. If the on-hold user preferences profile 168 exists, at operation 302 the on-hold server 160 determines one or more activity for the user based on the on-hold user preferences profile 168.

For example, a user may have selected a form of entertainment 306 such as a particular type of music, radio station and/or streaming service. The user may have requested that a menu of options 308 be presented, allowing them to select the functions/features they are interested in at that time. The menu of options may be displayed within the chat window 164, 166. The user may have requested that their account balances 310 be either displayed within the chat window 164, 166 or played over the speaker on their user device 120, 122, 124. The user may have requested that they be presented with marketing materials 312 for current and/or upcoming products, which may include subliminal or other forms of messaging, such as the frequent use of key words. The user may have requested that financial information and/or advice 314 be presented (e.g., budgeting advice, money management, and/or financial market performance). The user may identify a language preference 316 that may be applied to one or both of electronic operations and language of customer service representative. In other embodiments, the on-hold server 160 may facilitate the playing of a particular type of music, radio station or streaming service while displaying other options in the chat window 164, 166. The options presented in FIG. 3 are not exhaustive. The user may choose to modify their on-hold user preferences profile 168. Alternatively, the on-hold server 160 can choose to override the on-hold user preferences profile 168 to present information the enterprise 110 has identified as important and/or timely (e.g., weather delays and/or closures, changes in financial regulations, changes in policies and/or procedures).

Returning to operation 300, if an on-hold user preferences profile 168 does not exist for the user, the on-hold server 160 can determine an activity for the user based on a priority or hierarchy of what the enterprise 110 wants to present. This may include any of the activities 306-316, as well as other activities the enterprise 110 may deem important or desirable.

In other embodiments, the on-hold server 160 may determine that the user is a frequent caller. A frequent caller may be a user who calls the enterprise 110 a minimum number of times within a predetermined time window. This may indicate that a user needs more attention and/or may not have had their questions answered in previous calls. In some embodiments, the on-hold server 160 may move this user into an on-hold queue of a more senior customer service representative, such as a manager, or move them into a higher position in the on-hold queue 162.

In an example embodiment, the above-described methods are embodied in the form of processor-executable code and stored in a computer-readable program medium. Thus, a machine-readable medium having machine executable instructions stored thereon that, when executed by one or more processors, direct the one or more processors to perform a method described for FIGS. 1 to 3, and/or in the various embodiments described in this patent document.

Figure 4:
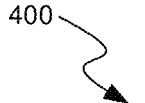
FIG. 4 is a block diagram illustrating an overview of devices on which some implementations of the on-hold server can operate in accordance with embodiments of the present technology.
Figure 4:
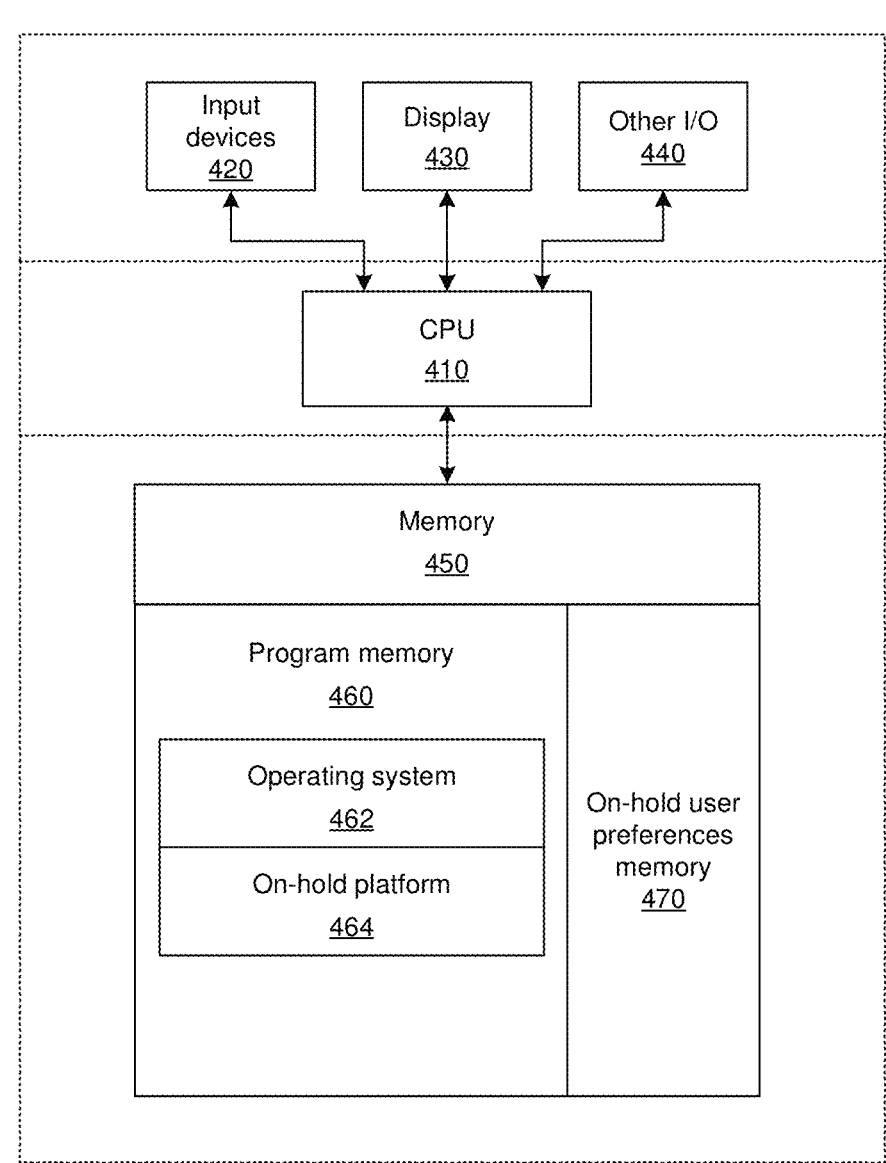

FIG. 4 is a block diagram illustrating an overview of devices on which some implementations of the on-hold server 160 can operate in accordance with embodiments of the present technology and will be discussed together with some of the elements of FIG. 1. The devices can comprise hardware components of a device 400, such as the on-hold server 160 that includes an on-hold platform 464 that sends a push notification to a user device 120, 122, 124, receives authentication credentials from the user based on a link in the push notification, and launches a chat window 164, 166 via an application on the user device 120, 124 in response to verifying the authentication credentials. The chat window 164, 166 may be opened on the user device 120, 124 that is operating the voice call. Alternatively, the chat window 164, 166 may be opened on a different user device 120, 124 that has the application 126, 128 if the user is signed into the application 126, 128. Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a person operating the device 400. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462 and on-hold platform 464. The on-hold platform 464 may include modules or processes or methods for requesting information from a user and providing options to the user to authenticate the user and identify the reason for the user's call as described in Section I and FIGS. 1 to 2 of this patent document. The on-hold platform 464 may also include modules for personalizing the user's on-hold experience as described in Section II and in FIGS. 1 to 3 of this patent document. Thus, for example, the memory 450 may store instructions that upon execution by CPU 410 configure the device 400 to perform the operations described for the on-hold server 160 in FIGS. 1 to 3 and/or in the various embodiments described in this patent document. Memory 450 can also include on-hold user preferences memory 470 that can include preferences stored by users as described in this patent document, which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIGS. 1-4 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for", but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:

1. A method for interacting with a user while the user is on-hold, the method comprising:

receiving, at an enterprise, a call from a user device associated with the user;

placing the call into an on-hold queue;

accessing an on-hold profile established for the user and obtaining current values for one or more data fields established in the-hold profile;

in response to the call being placed in the on-hold queue, requesting, from the user, an intent of the call;

launching a chat window by:

detecting that the user is logged into an application of an enterprise on a second device, other than the user device, and sending a command, to initiate a chat session, to the second device, wherein the chat window provides a textual, two-way communication interface with an entity of the enterprise, and wherein the chat window automatically provides a) the current values for the one or more data fields established in the on-hold profile and b) information associated with the intent of the call; and displaying a list of options, in the chat window, that includes a link configured to i) initiate displaying information in the chat window after the link is selected or ii) initiate the transferring of the call to a representative.

2. The method of claim 1, further comprising determining, based on the on-hold profile, at least one activity for the user while the call is in the on-hold queue.

3. The method of claim 2, further comprising providing the at least one activity via the chat window and/or a speaker of the user device, wherein the at least one activity comprises a selected form of entertainment, a predetermined music type or station or streaming service, marketing material, financial information or advice, or any combination thereof.

4. The method of claim 1, wherein, after receiving the intent of the call, the method further comprises determining that there is a digital solution associated with the intent; and wherein the information associated with the intent of the call, provided in the chat window, is information regarding the digital solution.

5. The method of claim 1, further comprising routing the call based on the intent of the call.

6. A non-transitory computer-readable storage medium storing instructions, for interacting with a user while the user is on-hold, the instructions, when executed by a computing system, cause the computing system to:

receive, at an enterprise, a call from a user device associated with the user;

place the call into an on-hold queue;

access an on-hold profile established for the user and obtain current values for one or more data fields established in the-hold profile;

in response to the call being placed in the on-hold queue, launch a chat window by:

detecting that the user is logged into an application of enterprise on a second device other than the user device and sending a command, to initiate a chat session, to the second device, wherein the chat window provides a textual, two-way communication interface with an entity of the enterprise, and wherein the chat window automatically provides the current values for the one or more data fields established in the on-hold profile; and display a list of options in the chat window that includes a link configured to i) initiate displaying information in the chat window after the link is selected or ii) initiate the transferring of the call to a representative.

7. The non-transitory computer-readable storage medium of claim 6, wherein the instructions, when executed, further cause the computing system to, in response to the call being placed in the on-hold queue, request an intent of the call; and wherein the chat window further automatically provides information associated with the intent of the call.

8. The computer-readable storage of claim 7, wherein the instructions, when executed, further cause the computing system to, after receiving the intent of the call, determine that there is a digital solution associated with the intent; and wherein the information associated with the intent of the call, provided in the chat window, is information regarding the digital solution.

9. The non-transitory computer-readable storage medium of claim 7, wherein the instructions, when executed, further cause the computing system to route the call based on the intent of the call.

10. The non-transitory computer-readable storage medium of claim 6, wherein the instructions, when executed, further cause the computing system to determine, based on the on-hold profile, at least one activity for the user while the call is in the on-hold queue.

11. The non-transitory computer-readable storage medium of claim 10, wherein the instructions, when executed, further cause the computing system to provide the at least one activity via the chat window and/or a speaker of the user device, wherein the at least one activity comprises a selected form of entertainment, a predetermined music type or station or streaming service, marketing material, financial information or advice, or any combination thereof.

12. A computing system for interacting with a user while the user is on-hold, the computing system comprising:

one or more processors; and one or more memories storing instructions that, when executed by the one or more processors, cause the computing system to:

receive a call from a user device associated with the user;

place the call into an on-hold queue;

access an on-hold profile established for the user and obtain current values for one or more data fields established in the-hold profile;

in response to the call being placed in the on-hold queue, launch a chat window by:

detecting that the user is logged into an application of enterprise on a second device other than the user device and sending a command, to initiate a chat session, to the second device, wherein the chat window provides a textual, two-way communication interface with an entity of the enterprise, and wherein the chat window that automatically provides the current values for the one or more data fields established in the on-hold profile; and display a list of options in the chat window that includes a link configured to i) initiate displaying information in the chat window after the link is selected or ii) initiate the transferring of the call to a representative.

13. The computing system of claim 12, wherein the instructions, when executed, further cause the computing system to, in response to the call being placed in the on-hold queue, request an intent of the call; and wherein the chat window further automatically provides information associated with the intent of the call.

14. The computing system of claim 13, wherein the instructions, when executed, further cause the computing system to, after receiving the intent of the call, determine that there is a digital solution associated with the intent; and wherein the information associated with the intent of the call, provided in the chat window, is information regarding the digital solution.

15. The computing system of claim 13, wherein the instructions, when executed, further cause the computing system to route the call based on the intent of the call.

16. The computing system of claim 12, wherein the instructions, when executed, further cause the computing system to determine, based on the on-hold profile, at least one activity for the user while the call is in the on-hold queue.

17. The computing system of claim 16, wherein the instructions, when executed, further cause the computing system to provide the at least one activity via the chat window and/or a speaker of the user device, wherein the at least one activity comprises a selected form of entertainment, a predetermined music type or station or streaming service, marketing material, financial information or advice, or any combination thereof.

* * * * *